United States Patent [19]
Fabian

[11] 3,886,657
[45] June 3, 1975

[54] WINDSHIELD WIPER SHARPENER

[76] Inventor: Ralf Fabian, 634 Cedar St., Mamaroneck, N.Y. 10543

[22] Filed: Feb. 28, 1974

[21] Appl. No.: 446,943

[52] U.S. Cl. .................................... 30/294; 83/614
[51] Int. Cl. ......................... B26b 13/22; B26d 3/02
[58] Field of Search ............ 30/124, 280, 289, 294, 30/293; 83/455, 614

[56] References Cited
UNITED STATES PATENTS

| | | | |
|---|---|---|---|
| 467,414 | 1/1892 | Hughes | 30/289 X |
| 2,065,761 | 12/1936 | Smith | 30/289 X |
| 2,973,577 | 3/1961 | Schekowski | 83/455 X |
| 3,394,457 | 7/1968 | Holder | 30/294 |

*Primary Examiner*—Al Lawrence Smith
*Assistant Examiner*—J. C. Peters

[57] ABSTRACT

Two embodiments of a windshield wiper sharpener with each having a guide body for holding the wiper as a new edge is being cut. Each of the embodiments presents a top inclined surface against which a razor blade is drawn to produce a new wiping edge which is formed at the proper angle. The blade may be maintained in this position by a special holder which is slidably secured to the body of the sharpener.

1 Claim, 4 Drawing Figures

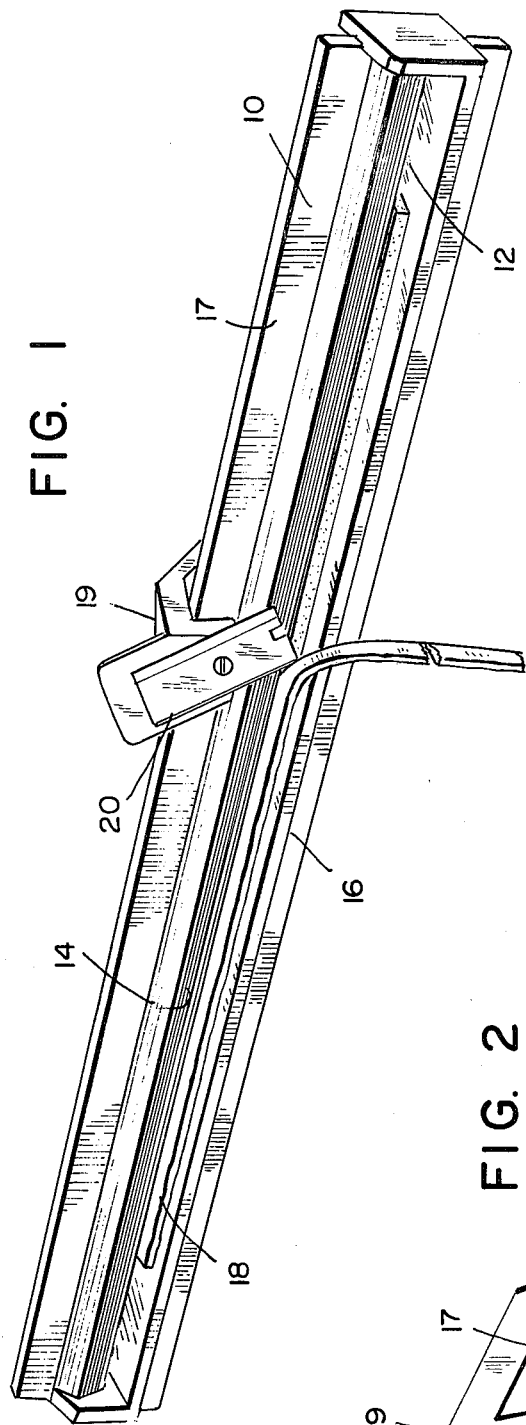
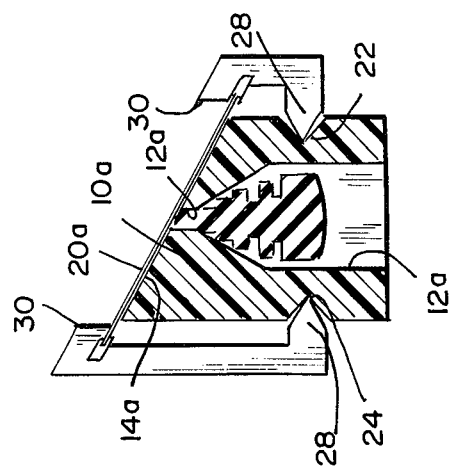
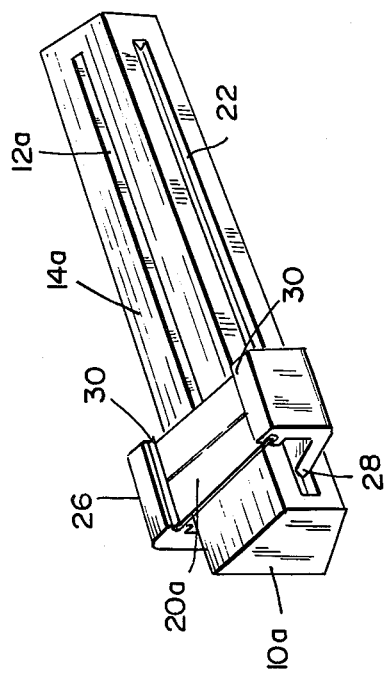
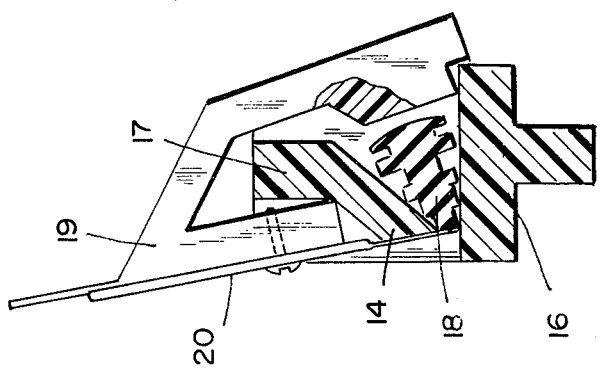

WINDSHIELD WIPER SHARPENER

This invention relates to sharpening tools and, in particular, to tools adapted to impart a sharpened edge substantially along the entire length of a body.

According to the present invention there is provided a guide body into which is inserted a rubberized body such as a windshield wiper blade. The wiping edge of the body should be formed at a fairly critical angle for effective operation and accordingly the guide body has a slotted top surface which is set at the angle which is desired for an effective wiping edge. Preferably, a slidable holder is associated with the guide body for holding the sharpening element, such as a razor blade, against the inclined top surface to assure the formation of the edge at such angle. If desired, a receptacle for the blades may be molded in one piece with the guide body.

One object of the invention is to provide an improved device for sharpening elongated edges of bodies at a preselected angle of cut.

Other objects and advantages of the invention may be appreciated on reading the following description of but two embodiments of the invention which is taken in conjunction with the accompanying drawings, in which:

FIG. 1 is a perspective view of one embodiment of the invention;

FIG. 2 is an enlarged section taken through the wiper holder and showing the blade holder slidably mounted thereon;

FIG. 3 is a perspective view of a second embodiment of the invention; and

FIG. 4 is a section similar to that shown in FIG. 2 showing the wiper and blade holders.

Referring to the drawings guide body 10 is provided with an internal slot 12 extending from its back surface entirely through the body to its front surface 14. The body is provided with a base 16 and a top rail 17. A rubber wiper blade 18 is inserted through the slot from the back of the body emerging through the slotted opening in the surface 14.

A blade holder 19 is slidably mounted on the rail 17 and on the bottom surface of the slot 12 in the back of the body 10. The surface 14 is formed at an angle relative to the sides of the rail 17 thus providing an inclined plane against which razor blade 20 in the holder 19 is pressed for cutting a sharp edge on the operative end of the wiper blade protruding through the slot in inclined surface 14. The blade holder is drawn along the surface 14 from one end of the body 10 to the other until the cutting edge for the entire length of the wiper blade has been cut.

A second embodiment of the invention is shown in FIG. 3. In this version the wiper blade 18a is inserted into a top to bottm slot 12a until it extends above top inclined surface 14a. Grooves 22 and 24 are formed in the sides of guide body 10a and blade holder 26 is slidably mounted on the body 10a, the holder 26 having interiorly directed bottom members 28 disposed in the grooves to effect such mounting. The upper portion of the holder is provided with opposing blade receiving components 30 which functionally hold the blade 20a against the surface 14a while at the same time maintaining the two members 28 on each side of the body 10a in operative position. The cutting of the operative edge of the wiper is otherwise performed in the same manner as previously described.

Various other modifications of the invention may be effected by persons skilled in the art without departing from the scope and principle of the invention as defined in the appended claims.

What is claimed is:

1. A sharpener for windshield wipers and the like comprising a guide body, said body having a slot extending therethrough with an opening on a first side and a second opening on an opposing, second side thereof, one of said sides having an inclined surface, a blade holder slidably mounted on said sharpener and adapted to retain a blade in close association with said, inclined surface, said body having opposing grooves formed in sides of the sharpener other than said first and second sides, said holder having interiorly directed bottom members engaging said grooves, whereby the blades of said holders are maintained in accurate disposition relative to said inclined surface.

* * * * *